United States Patent Office

2,862,913
GLUCOSIDE ESTERS AS SUSPENDING AGENTS IN VINYL HALIDE POLYMERIZATION PROCESS

Robert O. L. Lynn, Jr., Springfield, and Harold W. Mohrman, Longmeadow, Mass., assignors to Monsanto Chemical Company, St. Louis, Mo., a corporation of Delaware No Drawing. Application April 1, 1957
Serial No. 649,638

11 Claims. (Cl. 260—78.5)

This invention relates to a suspension polymerization process for the production of vinyl halide-containing polymers. More particularly, this invention relates to a suspension polymerization process in which certain novel suspending agents are employed.

In one of the customary preparations of vinyl halide-containing polymers, the polymers are polymerized in an aqueous medium containing a suspending agent to obtain the polymer in the form of small granules which are easily separated from the polymerization medium by filtration. Ideally, the granular polymers so obtained should be of a uniform small size and highly porous in nature so as to readily absorb plasticizers. The presence of large, non-porous grassy granules is undesirable, since such granules do not absorb plasticizer readily and this frequently leads to heterogeneity in the final product. Such heterogeneity is particularly noticeable when the vinyl halide-containing polymer is calendered into thin films.

Among the better suspending agents that have been proposed for the suspension polymerization of vinyl halide-containing polymers are the water-soluble interpolymers of maleic compounds such as the water-soluble interpolymers of maleic anhydride with vinyl acetate, vinyl methyl ether, ethylene, etc. While polymerization systems containing such suspending agents give high quality vinyl halide-containing polymers, it would be desirable to have improved polymerization systems which would give still smaller polymer particles and polymer particles of a more porous nature.

It is an object of this invention to provide an improved suspension polymerization process for the preparation of vinyl halide-containing polymers.

Another object of this invention is to provide an improved suspension polymerization process for the preparation of vinyl halide-containing polymers in which novel suspending agents are employed.

Other objects and advantages of this invention will be apparent from the following detailed description thereof.

It has been discovered that vinyl halide-containing polymers of fine particle size and good porosity can be prepared by polymerizing a vinyl halide monomer in an aqueous medium in the presence of (1) a water-soluble interpolymer of a maleic compound as a primary suspending agent and (2) certain di-fatty acid esters of alkyl glucosides as an auxiliary or secondary suspending agent. The fatty acid portion of the di-fatty acid esters contains 10–20 carbon atoms and the alkyl group of the alkyl glucoside contains 1–4 carbon atoms.

The following examples are set forth to illustrate more clearly the principle and practice of this invention to those skilled in the art. Where parts are mentioned, they are parts by weight.

EXAMPLE I

Part A

Vinyl chloride is polymerized in the polymerization system set forth below:

| Component: | Parts by weight |
|---|---|
| Water | 150 |
| Vinyl chloride | 100 |
| Maleic suspending agent | 0.1 |
| Auxiliary suspending agent | 0.1 |
| Lauroyl peroxide | 0.2 |

The above noted components are sealed in an oxygen-free glass-lined reaction vessel. The sealed reaction vessel is rotated end over end at 50° C. for 20 hours, at the end of which time the polymerization is terminated. The recovered polymer is highly porous in nature and has a desirable small particle size, with approximately 50% of the product passing through a 100 mesh screen and substantially all of the balance passing through a 60 mesh screen.

The maleic suspending agent employed in this example is an interpolymer of 50 mol percent maleic anhydride and 50 mol percent vinyl acetate in which approximately 4 mol percent of the maleic anhydride groups are esterified with 2-ethylhexanol. The auxiliary suspending agent employed is the di-oleic acid ester of alpha methyl glucoside.

Part B

Part A above is repeated except that the di-oleic acid ester of alpha methyl glucoside is not included in the polymerization system. The product obtained is appreciably less porous than the product of Part A and is of a larger particle size.

EXAMPLE II

Example I, Part A, is repeated except that the auxiliary suspending agent employed is the di-lauric acid ester of alpha methyl glucoside. Comparable results are obtained.

EXAMPLE III

Example II is repeated except that the monomer employed consists of a mixture of 90 parts of vinyl chloride and 10 parts of vinyl acetate. Essentially comparable results are obtained.

EXAMPLE IV

Example I is repeated except that the monomer employed consists of a mixture of 95 parts vinyl chloride and 5 parts diethyl maleate. Similar results are obtained.

EXAMPLES V–VII

Example II is repeated except that the auxiliary suspending agents employed are the di-lauric acid esters of, respectively, alpha ethyl glucoside, alpha n-propyl glucoside and alpha n-butyl glucoside. In each polymerization comparable results are obtained.

EXAMPLE VIII

Example II is repeated except that the maleic suspending agent employed is an ethylene-maleic anhydride interpolymer that is prepared by interpolymerizing ethylene and maleic anhydride in benzene under super-atmospheric pressure and has a specific viscosity of about 1.3 as determined in a 1% solution in dimethylformamide at 25° C. The vinyl chloride polymer obtained is highly porous and

EXAMPLE IX

Example II is repeated except that the maleic suspending agent employed is a partial tetrahydrofurfuryl ester of an ethylene-maleic anhydride interpolymer. This polymer is prepared by reacting 5 parts of tetrahydrofurfuryl alcohol with 95 parts of an ethylene-maleic anhydride interpolymer in 100 parts of toluene. The ethylene-maleic anhydride interpolymer employed in the esterification reaction is prepared by interpolymerizing ethylene and maleic anhydride in benzene under super-atmospheric pressure and the resulting interpolymer has a specific viscosity of 1.7 as determined in a 1% solution in dimethylformamide at 25° C. In the final product, 3.2 mol percent of the carboxyl groups of the ethylene-maleic anhydride interpolymer are esterified.

The vinyl chloride polymer obtained has good porosity and an average particle size comparable to that of the product obtained in Example VIII.

EXAMPLE X

To illustrate the wide latitude that may be employed in setting the ratio of the auxiliary suspending agent to the primary maleic suspending agent, several polymerizations are run employing the basic polymerization recipe and suspending agents set forth in Example I, Part A. The concentration of maleic suspending agent is set at three different levels and the quantity of auxiliary suspending agent employed is varied to give rations of the auxiliary suspending agent to the primary maleic suspending agent varying from 0.33/1 to 4/1.

A screen analysis is run on each of the polymer samples employing 40, 60, 80, 100 and 250 mesh screens. The particle size of the polymers is expressed quantitatively in terms of a screen analysis factor which is calculated in accordance with the following equation:

$$\text{Screen analysis factor} = \frac{\sum(\text{mesh size} \times \text{percent retained on mesh})}{100}$$

The higher the numerical value of the screen analysis factor, the smaller is the average particle size of the polymer.

The concentrations and ratios of suspending agents employed are shown in Table I together with the screen analysis factor of the polymer.

TABLE I

| Run No. | Weight percent maleic suspending agent | Weight percent auxiliary suspending agent | Ratio ASA/MSA [1] | Screen analysis factor |
|---|---|---|---|---|
| 1a | 0.05 | 0 | | 100 |
| 1b | 0.05 | 0.05 | 1/1 | 107 |
| 1c | 0.05 | 0.20 | 4/1 | 118 |
| 2a | 0.1 | 0 | | 128 |
| 2b | 0.1 | 0.05 | 0.5/1 | 131 |
| 2c | 0.1 | 0.20 | 2/1 | 137 |
| 2d | 0.1 | 0.40 | 4/1 | 130 |
| 3a | 0.15 | 0 | | 129 |
| 3b | 0.15 | 0.05 | 0.33/1 | 134 |
| 3c | 0.15 | 0.20 | 1.3/1 | 142 |
| 3d | 0.15 | 0.40 | 2.7/1 | 131 |

[1] ASA/MSA=auxiliary suspending agent/maleic suspending agent.

It will be observed from the above table that in each polymerization the addition of the auxiliary suspending agent to the primary maleic suspending agent gives a product having a higher screen analysis factor, i. e., a smaller average particle size. In addition to the smaller particle size, each of the polymers prepared in the presence of the auxiliary suspending agent is more porous and more readily absorbs plasticizer than the corresponding product prepared at the same concentration of primary maleic suspending agent, but in the absence of the auxiliary suspending agent.

EXAMPLE XI

Example X is repeated except that the auxiliary suspending agent employed is the di-lauric acid ester of alphamethyl glucoside. The results are set forth in Table II.

TABLE II

| Run No. | Weight percent maleic suspending agent | Weight percent auxiliary suspending agent | Ratio ASA/MSA [1] | Screen analysis factor |
|---|---|---|---|---|
| 1a | 0.05 | 0 | | 100 |
| 1b | 0.05 | 0.05 | 1/1 | 113 |
| 1c | 0.05 | 0.20 | 4/1 | 120 |
| 2a | 0.1 | 0 | | 128 |
| 2b | 0.1 | 0.05 | 0.5/1 | 126 |
| 2c | 0.1 | 0.20 | 2/1 | 134 |
| 2d | 0.1 | 0.40 | 4/1 | 144 |
| 3a | 0.15 | 0 | | 129 |
| 3b | 0.15 | 0.05 | 0.33/1 | 132 |
| 3c | 0.15 | 0.20 | 1.3/1 | 137 |
| 3d | 0.15 | 0.40 | 2.7/1 | 145 |

[1] ASA/MSA=auxiliary suspending agent/maleic suspending agent.

The above data substantiate and confirm the results obtained in Example X employing a different auxiliary suspending agent. Specifically, the addition of the auxiliary suspending agent to the primary maleic suspending agent reduces the average particle size of the vinyl chloride polymer and increases its porosity.

The primary suspending agents employed in the process of the present invention are water-soluble interpolymers of maleic compounds such as maleic acid, maleic anhydride and maleinimide. Typical examples of such water-soluble interpolymers include the interpolymers of maleic acid or maleic anhydride with vinyl methyl ether, vinyl acetate, ethylene, isobutylene, and such interpolymers that are partially esterified with 1–10 weight percent of a monohydric acyclic or heterocyclic alcohol such as butanol, hexanol, 2-ethylhexanol, tetrahydrofurfuryl alcohol, etc. Water-soluble maleic interpolymers of this type are well known and their use in the suspension polymerization of vinyl halide-containing polymers as described in U. S. Patents 2,470,911 and 2,476,474 issued to Massimo Baer and in the co-pending applications of R. I. Longley and R. H. Martin, Jr., Serial No. 530,612, filed August 25, 1955, now U. S. 2,823,200, and Serial No. 530,881, filed August 26, 1955, now U. S. 2, 824,862. Perhaps the most efficient of the maleic suspending agents in the practice of this invention are the interpolymers of vinyl acetate and maleic anhydride and particularly the partial esters of such interpolymers. Such water-soluble maleic interpolymers may be prepared by numerous well-known polymerization techniques.

The auxiliary or secondary suspending agents employed in the present invention are di-fatty acid esters of alkyl glucosides in which the alkyl group contains 1–4 carbon atoms. The alkyl glucosides are known compounds and are obtainable in two isomeric forms known as the alpha and beta isomers. Although either isomer may be employed, it is preferred to employ the alpha isomers on the basis of both cost and performance. The fatty acids from which the auxiliary suspending agents are derived contain from about 10 to about 20 carbon atoms and may be either saturated or unsaturated. Typical examples of the acids that may be employed are decanoic acid, lauric acid, myristic acid, palmitic acid, stearic acid, oleic acid, etc. As noted above, the auxiliary suspending agent should be essentially the diester, although from the nature of the diester preparation, there will nearly always be formed therewith small percentages of monoester and higher esters such as the tri- and tetra esters. The auxiliary suspending agents can be prepared by the methods disclosed in "Argo Brand Methyl Glucoside R3," Technical Bulletin R3–5, published November 1, 1954, by Corn Products Refining Company, Chemical Division, 17 Battery Place, New York 4, New York.

Both the primary suspending agent and the auxiliary suspending agent are employed in small amounts. The primary water-soluble maleic interpolymer suspending agent is employed in the amount of 0.005–2.0% and more particularly 0.01–0.5 weight percent, such percentages being based upon the monomers. The auxiliary suspending agent is ordinarily employed within these same concentration limits. As illustrated in Examples X and XI, the ratio of the auxiliary suspending agent to the primary water-soluble maleic suspending agent may be varied widely, but is usually adjusted to fall within the limits of from about 0.2/1 to 10/1 and preferably from about 0.33/1 to about 4/1.

Except for the suspending agents employed, the polymerizations of the present invention are carried out in the conventional manner. The ratio of water to monomers may vary from about 1:1 to about 9:1, but is ordinarily set in the range of about 1.5:1 to 2:1. The polymerization initiators employed are normally free radical generating initiators such as benzoyl peroxide, lauroyl peroxide, ditertiary butyl peroxide, toluyl peroxide and the like.

The process of the present invention is useful in the homopolymerization of vinyl fluoride, vinyl chloride, vinyl bromide and mixtures thereof and the interpolymerization of such vinyl halides with interpolymerizable unsaturated compounds such as vinyl esters of carboxylic acids, e. g., vinyl acetate, vinyl propionate, vinyl butyrate, vinyl stearate, vinyl benzoate; esters of alpha, beta unsaturated polycarboxylic acids, e. g., the methyl, ethyl, ethyl acrylate, butyl acrylate, 2-ethylhexyl acrylate, allyl acrylate, and the corresponding esters of methacrylic acid; amides such as acrylamide, acrylanilide, methacrylamide, etc.; nitriles, e. g., acrylonitrile, methacrylonitrile; vinylidene chloride; trichloroethylene; esters of alpha, beta unsaturated polycarboxylic acids, e. g., the methyl, ethyl, propyl, butyl, amyl, hexyl, heptyl, octyl, allyl and methallyl esters of maleic, itaconic and fumaric acids and the like. Preferably, in the case of interpolymerizations, more than 50% by weight of the mixture of monomers is a vinyl halide and especially vinyl chloride.

The above descriptions and particularly the examples are set forth by way of illustration only. Many other modifications and variations thereof will be obvious to those skilled in the art and can be made without departing from the spirit and scope of the invention herein described.

What is claimed is:

1. In a process for the suspension polymerization of a vinyl halide of the group consisting of vinyl fluoride, vinyl chloride and vinyl bromide in which the vinyl halide is suspended and polymerized in water containing a water-soluble interpolymer of a maleic compound of the group consisting of maleic anhydride, maleic acid and maleinimide and an interpolymerizable vinylidene monomer as a suspending agent for the vinyl halide polymer; the improvement which comprises incorporating in the polymerization system, as an auxiliary suspending agent, an alkyl glucoside diester of a monobasic fatty acid containing 10–20 carbon atoms, the alkyl group of said alkyl glucoside containing 1–4 carbon atoms.

2. The process of claim 1 in which the vinyl halide polymerized is vinyl chloride.

3. The process of claim 2 in which the auxiliary suspending agent employed is an alpha methyl glucoside diester of a monobasic fatty acid containing 10–20 carbon atoms.

4. The process of claim 2 in which the auxiliary suspending agent employed is the alpha methyl glucoside diester of lauric acid.

5. The process of claim 2 in which the auxiliary suspending agent employed is the alpha methyl glucoside diester of oleic acid.

6. The process of claim 2 in which the water-soluble interpolymer of the maleic compound employed as the suspending agent is selected from the group consisting of vinyl acetate-maleic anhydride interpolymers, ethylene-maleic anhydride interpolymers and such interpolymers which are esterified with 1–10 weight percent of an alcohol of the group consisting of monohydric acyclic alcohols and tetrahydrofurfuryl alcohol.

7. The process of claim 6 in which both the water-soluble interpolymer of the maleic compound and the alkyl glucoside diester of a monobasic fatty acid are present in the amount of 0.005–2.0 weight percent of the monomers.

8. The process of claim 7 in which a predominant proportion of vinyl chloride is interpolymerized with a minor proportion of a vinyl ester of a monocarboxylic acid.

9. The process of claim 8 in which the vinyl ester of a monocarboxylic acid employed is vinyl acetate.

10. The process of claim 7 in which a predominant proportion of vinyl chloride is interpolymerized with a minor proportion of an alkyl ester of an alpha, beta unsaturated dicarboxylic acid.

11. The process of claim 10 in which the alkyl ester of the alpha, beta unsaturated dicarboxylic acid employed is diethyl maleate.

References Cited in the file of this patent

UNITED STATES PATENTS

| | | |
|---|---|---|
| 1,951,785 | Bertsch | Mar. 20, 1934 |
| 2,772,256 | Manganelli | Nov. 27, 1956 |
| 2,772,257 | Manganelli | Nov. 27, 1956 |
| 2,772,258 | Manganelli | Nov. 27, 1956 |

OTHER REFERENCES

"Atlas Surface Active Agents," Atlas Powder Company, 1948, Wilmington, Delaware, Sec. Printing, page 4.